Oct. 15, 1968    F. N. WROBLE    3,405,569
CONTROL APPARATUS FOR AXIALLY SHIFTABLE SHAFT
Filed May 20, 1966
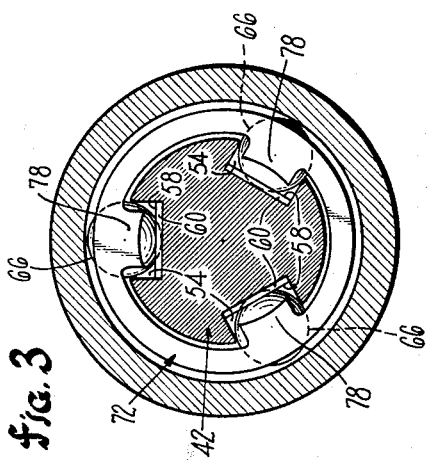
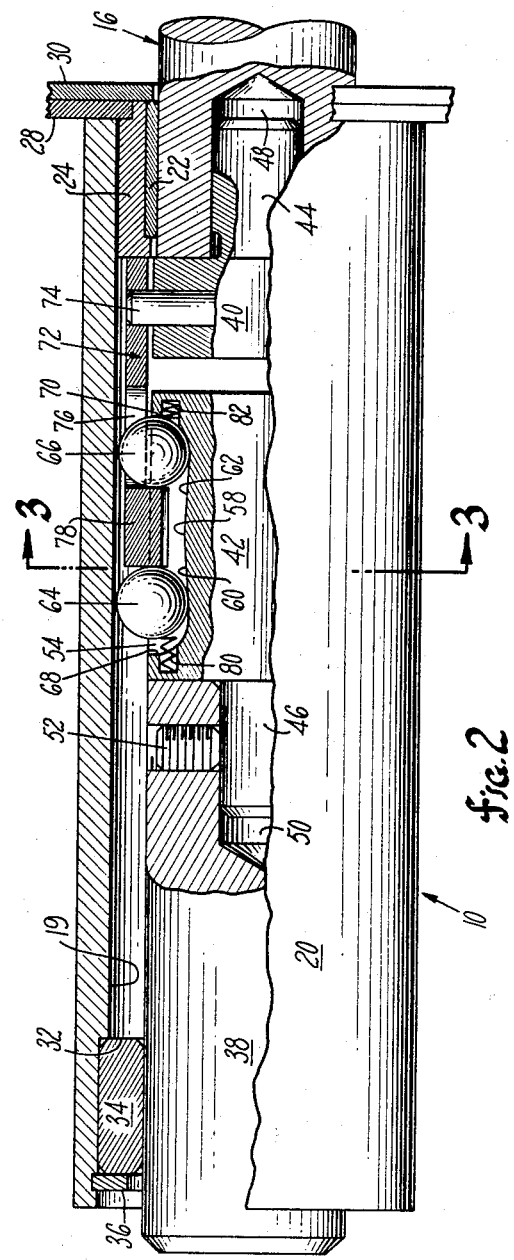
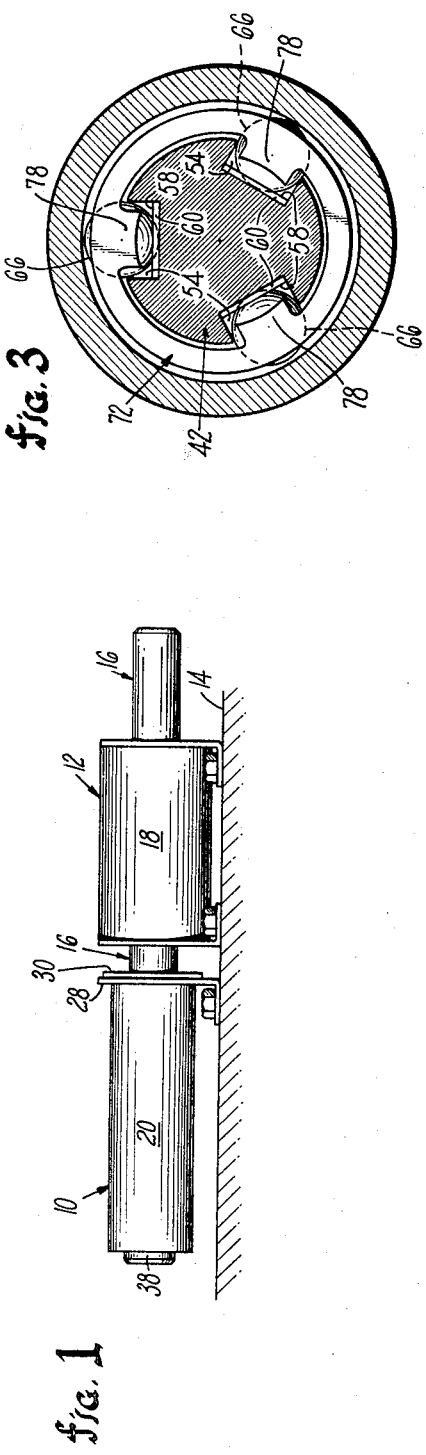
INVENTOR.
F. NORMAN WROBLE
BY
Lindsey, Prutzman and Hayes
ATTORNEYS

United States Patent Office 3,405,569
Patented Oct. 15, 1968

3,405,569
CONTROL APPARATUS FOR AXIALLY
SHIFTABLE SHAFT
Francis Norman Wroble, Wethersfield, Conn., assignor to
Skinner Precision Industries, Inc., New Britain, Conn.,
a corporation of Connecticut
Filed May 20, 1966, Ser. No. 551,804
10 Claims. (Cl. 74—527)

ABSTRACT OF THE DISCLOSURE

Apparatus comprising a housing, coaxial input and output shafts having adjacent end portions received in the housing for reciprocating rectilinear movement therein between first and second limit positions, and a driving connection between said shafts including a linear movement clutch permitting unrestricted axial shifting of said output shaft while providing positive locking thereof in an infinite number of positions between said stroke limit positions upon stopping the input shaft at any point along its path of travel.

---

This invention generally relates to an apparatus for controlling linear movement of a driven member and particularly concerns apparatus of the type usable in controlling an axially shiftable shaft.

A primary object of the invention is to provide an improved control apparatus for transmitting a linear driving force to a driven member such as a shaft and for locking it at any point along its path of travel immediately upon removal of the driving force.

Another object of the invention is to provide an improved control apparatus of the above-described type which is of notable use in conjunction with intermittent-duty linear motion producing devices.

A further object of the invention is to provide an improved linear movement clutch for a shaft driven by a linear induction motor and which is operable to lock the shaft upon de-energizing the linear induction motor.

Another object of the invention is to provide a linear movement clutch of the above-described type which virtually isolates its power source from the effect of load backlash or other load reactions upon removal of the driving force.

Still another object of the invention is to provide an improved linear movement clutch incorporating a minimum number of moving parts in a rugged compact assembly which is essentially free of maintenance requirements and which is durable in operation.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIG. 1 is a side elevational view of the invention showing a clutch mechanism in conjunction with a linear induction motor;

FIG. 2 is an enlarged view of the clutch mechanism, partly in section and partly broken away; and FIG. 3 is a section view taken along line 3—3 of FIG. 2.

Referring now to the drawing in detail wherein a preferred embodiment of the invention is illustrated, a clutch mechanism 10 is shown in conjunction with a reversible linear induction motor actuator 12. Both the clutch mechanism 10 and the linear actuator 12 are mounted on a supporting surface 14. The linear actuator 12 is of the general type described in copending United States patent application Ser. No. 474,122 entitled "Linear Induction Motor Actuator With Electromagnetic Detent," invented by Robert H. Martin and me, and includes a stator, not shown, having coils connected in a well known manner to a suitable source of alternating current power for driving an input shaft or armature 16. The armature 16 is supported in a housing 18 of the linear actuator 12 for axial reciprocating movement by induction motor action. Thus, when the stator coils are energized, an electromagnetic field is produced that moves along the stator to produce movement of the armature 16 linearly to the left or right in the direction of travel of the electromagnetic field. The armature 16 is shown in its right limit position in FIG. 2.

Referring now more specifically to FIG. 2, the armature 16 extends into a coaxially aligned central bore 19 of a tubular housing 20 of the clutch mechanism 10. The armature 16 is supported for sliding movement in a bearing sleeve 22 seated within a collar 24 which, in turn, is fitted inside the central bore 19 and secured to a mounting plate 28 fixed by welding, e.g., to an end flange 30 on the right-hand end of the tubular housing 20. Its left-hand end is shown counterbored to provide an annular shoulder 32 at the juncture with the central bore 19. A bearing sleeve 34 is seated against the annular shoulder 32 and is retained against axial displacement by a snap ring 36 suitably secured in the tubular housing 20 whereby the bearing sleeve 34 is secured to support an output shaft 38 for axial reciprocating movement in the housing 20.

In the specific illustrated embodiment, both the armature 16 and the output shaft 38 are shown in the form of cylindrical rods each including an end piece 40, 42 having a shank 44, 46 respectively fixed in bores 48, 50 formed in adjacent ends of the armature 16 and the output shaft 38. Shank 44 is press fit, e.g., into the bore 48 of the armature 16; shank 46 is shown secured to the output shaft 38 by a set screw 52.

Upon energizing the linear actuator 12, the clutch mechanism 10 permits the output shaft 38 to be axially shifted in response to movement of the armature 16 but positively locks the output shaft 38 against movement in opposite linear directions immediately upon stopping the armature 16 at any point along its path of travel when the linear actuator 12 is de-energized.

More specifically, the end piece 42 of the output shaft 38 is shown having three axial grooves 54 angularly spaced apart at approximately 120°. The grooves 54 are of equal length and are each spaced an equal distance from the right-hand end of the end piece 42. Each groove 54 includes a double sloping base having at its midpoint a transverse apex 58 defining meeting ends of a pair of converging recessed ramps 60, 62.

The end piece 42 of the output shaft 38 is thus tapered in opposite axial directions from a common plane extending transversely through the midpoint or apex 58 of each of the axial grooves 54. The ramps 60, 62 of each groove 54 support a pair of locking members or balls 64, 66. The locking balls 64, 66 are movable on their respective ramps 60, 62 toward one another from a release position at opposite axial ends of their groove 54 defined by shoulders 68, 70.

Coaxially surrounding the end piece 42 of the output shaft 38 is a sleeve 72. Sleeve 72 is fixed to the end piece 40 of the armature 16 by a suitable fastener such as the illustrated pin 74. Intermediate the longitudinal ends of the sleeve 72 are three axial slots, such as that shown at 76, equiangularly spaced apart to correspond with the axial grooves 54. The right-hand locking ball 66 in each axial groove 54 is received in the corresponding axial slot 76 immediately to the right of a drive member 78 integrally formed on the end of the sleeve 72 and positioned between each pair of locking balls 64, 66.

Each drive member 78 is preferably of greater thickness than the sleeve 72 (FIG. 3) thereby at once providing increased strength and proper engagement with the locking balls 64, 66.

The armature 16 is movable relative to the output shaft 38 to an extent limited by the total clearance or end play between drive members 78 and their respective locking balls 64, 66 in their release positions. This end play will be immediately taken up under static conditions by small coil compression springs 80, 82 which axially bias locking balls 64, 66 toward their drive member 78, the springs 80, 82 respectively being seated in cavities at opposite axial ends of each groove 54.

Upon applying AC power to the linear actuator 12 to move armature 16 to the left from its right limit position shown in FIG. 2, the drive members 78 engage the left-hand locking balls 64 to move them out of their illustrated operating positions and into seating engagement with shoulders 68. This causes a driving force to be applied through locking balls 64 to thrust the output shaft 38 from right to left in the direction of movement of the armature 16. Under such dynamic conditions, an inertial drag will be effected on the right-hand locking balls 66 in opposition to the bias of their springs 82 which will be rendered ineffective. Upon stopping movement of the armature 16, springs 80, 82 immediately bias the locking balls 64, 66 along ramps 60, 62 toward wedging engagement with housing 20 for locking the output shaft 38 against axial movement in opposite linear directions.

Any feedback forces from a driven load, e.g., which are applied to the output shaft 38 from left to right are positively prevented from affecting either the armature 16 or the linear actuator 12 by the right-hand locking balls 66 which retain the output shaft 38 against linear movement to the right. Likewise, the output shaft 38 will be maintained by the left-hand balls 64 against movement in response to any force tending to move the output shaft 38 to the left. In either case, the locking balls 64, 66 in each groove 54 are continuously urged by springs 80, 82 toward wedging contact between their ramps 60, 62 and the housing 20.

It is to be noted that the above-described locking action of the clutch mechanism 10 will be effected upon stopping armature 16 in its left limit position (when the left-hand locking balls 64 seat against bearing sleeve 34) or when the armature 16 is stopped intermediate its stroke limits, whichever occurs first.

Upon moving the armature 16 from left to right, the right-hand locking balls 66 are driven by their drive members 78 out of locking engagement with the housing 20 and into their release positions so as to seat against shoulders 70, thereby to release the output shaft 38 so that it may be driven to the right. Upon stopping left-to-right movement of the armature 16 at any point along its path of travel, clutch mechanism 10 will immediately lock the output shaft 38 in position as described above.

The symmetrical arrangement of the locking balls provides a holding force of high magnitude which is equally distributed about the output shaft 38 and continuously maintains it against axial displacement so long as the armature 16 remains stationary. This is particularly important when load backlash or other axial forces are applied to the output shaft 38 upon stopping the armature 16. The latter is thus virtually isolated from any load reactions, and the need to continuously supply electrical power to the linear actuator 12 for producing a holding force on the armature 16, e.g., during a long-time fixed position holding application, is entirely eliminated. This significantly minimizes the power requirements of the apparatus when the linear actuator 12 is employed on an intermittent-duty basis.

The above-described clutch mechanism effectively transmits driving forces without slippage in opposite linear directions between the stroke limits of the device. Within the stroke limits, the output shaft can be locked against movement in an infinite number of positions. Since power need be applied only during movement of the input shaft and not for holding it in a desired fixed position, the power requirements are minimal, resulting in an exceptionally efficient arrangement. Finally, the above noted advantages are provided in a compact rugged structure having a minimum number of moving parts capable of long dependable service essentially free of maintenance requirements.

As will be apparent to persons skilled in the art, various modifications and adaptations of the structure above-described will become readily apparent without departure from the spirit and scope of the invention, the scope of which is defined in the appended claims.

I claim:
1. An apparatus comprising a housing, input and output shafts generally axially aligned having adjacent end portions received in said housing for reciprocating rectilinear movement therein between first and second stroke limit positions, power means for reciprocating said input shaft, and a driving connection between said input and output shafts including a linear movement clutch permitting unrestricted axial shifting of said output shaft between said stroke limit positions in response to movement of said input shaft but positively locking said output shaft against movement in a predetermined axial direction and in an infinite number of positions between said stroke limit positions upon stopping said input shaft at any point along its path of travel.

2. The apparatus of claim 1 wherein said power means include a linear induction motor actuator having an armature constituting said input shaft mounted for reciprocating rectilinear movement by induction motor action.

3. The apparatus of claim 1 wherein said end portion of said output shaft is tapered in said predetermined axial direction to provide a longitudinally extending ramp, and wherein said linear movement clutch includes a locking member supported on said ramp for movement between an operating position wherein said locking member is wedged into locking engagement with said housing upon stopping said input shaft at any point along its path of travel, and a release position wherein said locking member is released from locking engagement with said housing upon initiating movement of said input shaft.

4. The apparatus of claim 3 wherein said locking member is continuously biased toward its said operating position for immediately locking said output shaft when said input shaft is stopped to isolate it from any forces applied to said output shaft in said predetermined axial direction.

5. The apparatus of claim 3 wherein said linear movement clutch further includes a drive member engageable with said locking member upon movement of said input shaft in said predetermined axial direction, said drive member being movable by said input shaft into cooperative engagement with said locking member for shifting the same from said operating position to said release position and for driving said output shaft in said predetermined axial direction.

6. An apparatus comprising a housing, input and output shafts generally axially aligned having adjacent end portions received in said housing for reciprocating rectilinear movement therein, said end portion of said output shaft being contoured to provide a pair of converging ramps sloping in opposite axial directions from a transverse apex therebetween, power means for reciprocating said input shaft, and a driving connection between said input and output shafts including a linear movement clutch having a pair of locking members supported on said ramps and engageable with said housing permitting axial shifting of said output shaft in response to movement of said input shaft but positively locking said output shaft against movement in opposite axial directions upon stopping the movement of said input shaft at any point along its path of travel, and a drive member positioned between said pair of locking members and movable by said input shaft into engagement with said locking members, alternately, upon reciprocating movement of said input shaft to unlock said output shaft and drive the same in the direction of movement of said input shaft.

7. An apparatus comprising a housing, input and output shafts generally axially aligned having adjacent end portions received in said housing for reciprocating rectilinear movement therein, said end portion of said output shaft including a plurality of axial grooves formed therein in equiangularly spaced apart relation, said axial grooves each having a double-sloping base with an intermediate transverse apex defining meeting ends of a pair of convering recessed ramps, power means for reciprocating said input shaft, and a driving connection between said input and output shafts including a linear movement clutch having a pair of locking balls received in each of said axial grooves and respectively supported on one of said recessed ramps thereof for movement between an operating position wherein said locking balls are wedged into locking engagement with said housing for locking said output shaft in opposite axial directions upon stopping said input shaft at any point along its path of travel, and a release position wherein said locking balls are released from locking engagement with said housing upon initiating movement of said input shaft.

8. An apparatus comprising a housing, input and output shafts generally axially aligned having adjacent end portions received in said housing for reciprocating rectilinear movement therein, said end portion of said output shaft being contoured to provide a pair of converging ramps sloping in opposite axial directions from a transverse apex therebetween, power means including a linear induction motor actuator having an armature constituting said input shaft mounted for reciprocating rectilinear movement by induction motor action, and a driving connection between said armature and said output shaft including a linear movement clutch having a pair of locking members supported on said ramps and engageable with said housing permitting axial shifting of said output shaft in response to movement of said armature but positively locking said output shaft against movement in opposite axial directions upon stopping the movement of said armature at any point along its path of travel by de-energizing said linear induction motor actuator, and a drive member drivingly connected to said armature and engageable with said locking members, alternately, upon reciprocating movement of said armature to unlock said output shaft and drive the same in the direction of movement of said armature.

9. The apparatus of claim 7 wherein said linear movement clutch further includes a sleeve coaxially surrounding said end portion of said output shaft and fixed to said end portion of said input shaft, said sleeve having a plurality of axial slots intermediate its longitudinal ends corresponding to said axial grooves and receiving one locking ball of each of said pair of locking balls for limited longitudinal movement relative to said sleeve between said operating and release positions, and said sleeve having an outer end portion positioned between each of said pair of locking balls for alternate cooperative engagement therewith upon reciprocating movement of said input shaft to unlock said output shaft and drive the same in the direction of movement of said input shaft.

10. The apparatus of claim 8 wherein each of said locking members is continuously urged toward locking engagement with said housing for immediately locking said output shaft when said armature is stopped to isolate it from any forces applied to said output shaft upon de-energizing said linear induction motor actuator.

References Cited
UNITED STATES PATENTS

| | | | |
|---|---|---|---|
| 2,329,182 | 9/1943 | Boynton | 74—527 |
| 1,916,491 | 7/1933 | Rose | 310—13 |

FRED C. MATTERN, JR., *Primary Examiner.*

F. D. SHOEMAKER, *Assistant Examiner.*